United States Patent
Charfi et al.

(10) Patent No.: US 9,311,054 B2
(45) Date of Patent: Apr. 12, 2016

(54) METHOD AND SYSTEM FOR SPECIFYING AND ENFORCING EXTENSIBILITY OF SOFTWARE APPLICATIONS

(71) Applicants: Anis Charfi, Darmstadt (DE); Mohamed Aly, Cairo (EG)

(72) Inventors: Anis Charfi, Darmstadt (DE); Mohamed Aly, Cairo (EG)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/015,624

(22) Filed: Aug. 30, 2013

(65) Prior Publication Data

US 2015/0067637 A1   Mar. 5, 2015

(51) Int. Cl.
G06F 9/44 (2006.01)
G06F 9/445 (2006.01)
G06F 21/54 (2013.01)

(52) U.S. Cl.
CPC *G06F 8/24* (2013.01); *G06F 21/54* (2013.01); *G06F 8/35* (2013.01); *G06F 8/71* (2013.01); *G06F 9/44526* (2013.01)

(58) Field of Classification Search
None
See application file for complete search history.

(56) References Cited

U.S. PATENT DOCUMENTS

| | | | | |
|---|---|---|---|---|
| 6,601,113 | B1 * | 7/2003 | Koistinen et al. | 719/316 |
| 7,509,638 | B2 * | 3/2009 | Backhouse et al. | 717/177 |
| 7,587,722 | B2 * | 9/2009 | Bendapudi et al. | 719/319 |
| 8,161,401 | B2 * | 4/2012 | Chen et al. | 715/770 |
| 8,239,882 | B2 * | 8/2012 | Dhanjal et al. | 719/319 |
| 8,789,071 | B2 * | 7/2014 | Chang et al. | 719/328 |
| 2002/0174161 | A1 * | 11/2002 | Scheetz et al. | 709/100 |
| 2006/0026591 | A1 * | 2/2006 | Backhouse et al. | 717/177 |
| 2006/0150202 | A1 * | 7/2006 | Bendapudi et al. | 719/328 |
| 2007/0055936 | A1 * | 3/2007 | Dhanjal et al. | 715/700 |
| 2007/0288887 | A1 * | 12/2007 | Pepin | G06F 8/24 717/105 |
| 2009/0044140 | A1 * | 2/2009 | Chen et al. | 715/770 |
| 2012/0036516 | A1 * | 2/2012 | Chang et al. | 719/316 |
| 2012/0159429 | A1 * | 6/2012 | Villadsen | G06F 8/24 717/106 |
| 2013/0125145 | A1 * | 5/2013 | Balmori Labra | G06F 9/44526 719/328 |
| 2013/0246996 | A1 * | 9/2013 | Duggal | G06F 8/35 717/104 |
| 2014/0025949 | A1 * | 1/2014 | Kay et al. | 713/168 |
| 2014/0041016 | A1 * | 2/2014 | Chanda | G06F 21/54 726/17 |
| 2014/0053133 | A1 * | 2/2014 | Schlarb | G06F 8/24 717/120 |
| 2014/0137079 | A1 * | 5/2014 | Witteborg | G06F 8/71 717/120 |

OTHER PUBLICATIONS

Greiler, M., et al., Understanding Plug-in Test Suites from an Extensibility Perspective, 17th Working Conference on Reverse Engineering (WCRE), 2010, pp. 67-76, [retrieved on Jan. 30, 2016], Retrieved from the Internet: <URL:http://ieeexplore.ieee.org/>.*

Yang, J., et al., An extension mechanism and its application to educational software for real-time control experiment, 2011 International Conference on Computer Science and Network Technology (ICCSNT), Dec. 24-26, 2011, pp. 450-454, [retrieved on Jan. 30, 2016], Retrieved from the Internet: <URL:http://ieeexplore.ieee.org/>.*

Sutherland Jeff,"Business Objects in Corporate Information Systems", ACM Computing Surveys, vol. 27, No. 2, Jun. 1995, pp. 274-276.

(Continued)

*Primary Examiner* — Thuy Dao
*Assistant Examiner* — Geoffrey St Leger
(74) *Attorney, Agent, or Firm* — Brake Hughes Bellermann LLP

(57) ABSTRACT

The method includes generating at least one base object, and generating at least one extendable object associated with the base object, the extendable object defining an insertion point and is configured to enable addition of new functionalities to an application including the at least one base object.

18 Claims, 7 Drawing Sheets

(56) References Cited

OTHER PUBLICATIONS

Sullivan et al., "Modular Aspect-Oriented Design with XPIs", ACM Journal Name, vol. V, No. N, Apr. 2009, pp. 1-36.
Steimann et al. "Types and Modularity for Implicit Invocation with Implicit Announcement", ACM Transactions on Software Engineering and Methodology, vol. 20, No. 1, Article 1, Jun. 2010, pp. 1-36.
Holzner Steve,"Eclipse", Publisher: O' Reilly, ISBN: 0-596-00641-1; Apr. 2004, 525 pages.
Scharli et al.,"Traits: Composable Units of Behaviour", Published in ECOOP, Springer Verlag, 2003, pp. 1-25.
Omg, "Business Process Model and Notation (BPMN)",Version 2.0, available at: < http://www.omg.org/spec/BPMN/2.0>Retrieved on Jan. 2011, 538 pages.
Heinlein Christian,"Vertical, Horizontal, and Behavioural Extensibility of Software Systems", Dept. of Computer Structures, University of Ulm, Germany, 2003, pp. 1-14.
Gamma et al.,"Design Patterns CD Elements of Reusable Object-Oriented Software", available at:< http://lci.cs.ubbcluj.ro/~raduking/Books/Design%20Patterns/> Retrieved on Aug. 21, 2002, 381 pages.
"OSGi Service Platform",OSGi Open Services Gateway Initiative, Release 3, Mar. 2003, 602 pages.
Aldrich, Jonathan,"Open Modules: Modular Reasoning about Advice",Proceeding ECOOP'05 Proceedings of the 19th European conference on Object-Oriented Programming,Carnegie Mellon University, Pittsburgh, PA 15213, USA, Jul. 25, 2005, 25 pages.
Aly et al.,"On the Extensibility Requirements of Business Applications", Proceedings of the 2012 workshop on Next Generation Modularity Approaches for Requirements and Architecture,NEMARA'12, Potsdam, Germany, Mar. 27, 2012, pp. 1-5.

Aly et al.,"Understanding Multilayered Applications for Building Extensions",Proceedings of the 1st workshop on Comprehension of complex systems,CoCoS '13, Fukuoka, Japan, Mar. 25, 2013, pp. 1-5.
Bracha et al.,"Mixin-based Inheritance", 90 Proceedings of the European conference on object-oriented programming on Object-oriented programming systems,Sep. 1, 1990, pp. 1-9.
Eysholdt et al.,"Xtext—Implement your Language Faster than the Quick and Dirty way",Proceedings of the ACM international conference companion on Object oriented programming systems languages and Tutorial Summary, SPLASH '10 Nevada, USA,Oct. 17-21, 2010, pp. 307-309.
Ichisugi et al.,"Difference-Based Modules: A Class-Independent Module Mechanism",Series vol. 2374,Jun. 10-14, 2002, 28 pages.
Inostroza et al.,"Modular Reasoning with Join Point Interfaces",Technical report, Nr. TUD-CS-2011-0272, Oct. 3, 2011,12 pages.
Kiczales et al.,"An Overview of AspectJ",Proceedings of the 15th European Conference on Object-Oriented Programming, Jun. 18, 2001, 28 pages.
Madsen et al.,"Virtual Classes a Powerful Mechanism in Object-Oriented Programming",Conference proceedings on Object-oriented programming systems, languages and applications, vol. 24 Issue 10, Aug. 7, 1989, 25 pages.
Mayfield et al.,"Integrity in Automated Information Systems",C Technical Report 79-91, Library No. S-237,254, (IDA Paper P-2316),Prepared for National Computer Security Center (NCSC), Institute for Defense Analyses, 1801 N. Beauregard Street, Alexandria, Virginia 22311,Sep. 1991,130 pages.

\* cited by examiner

METHOD AND SYSTEM FOR SPECIFYING AND ENFORCING EXTENSIBILITY OF SOFTWARE APPLICATIONS

FIELD

Embodiments relate to extending functionality of software applications.

BACKGROUND

Extensibility is generally a requirement in modern software applications. In the context of business applications extensibility is a common selection criteria from a customer perspective. Therefore, software providers seek to provide support for extensibility to meet customer needs. However, there are some challenges that face software developers with respect to the specification and enforcement of extension possibilities of their software. The term extension interface typically refers to the extension possibilities offered by a software application. More specifically, an extension interface defines the resources of a base application that are allowed to be extended, how the software application is extended (e.g., on the programming level), what resources of the base application an extension developer and/or extension object is allowed to access, as well as where and when the extension code will run.

While concepts for such interfaces are a considered with regard to "traditional" software which is constructed using a single programming language. However, extension interfaces are completely missing for complex applications consisting of several abstraction or architectural layers. In addition, state-of-the-art approaches are limited with respect to the specification of extension interfaces. Further, extension interfaces do not support providing different extension interfaces for different stakeholders. Furthermore, the software provider has to manually provide the code that is responsible for providing an extension interface. This code is typically mixed with the functional code of the application, which limits the quality of the software and makes software maintenance difficult.

Accordingly, typical approaches for specifying and enforcing extension interfaces for software systems have at least the following problems. First, typical approaches provide a one-size-fits-all extension interface. In typical approaches, specifying different extension interfaces for different groups of extension developers and/or extension objects is typically not possible. Second, typical approaches do not support the multi-layered nature of software applications, which involve multiple layers and multiple artifacts on these layers (e.g. UI models, business process models, code artifacts, database tables, etc.). All existing approaches express extension possibilities on the technical code layer although an extension typically spans several layers. As a result, an extension developer and/or extension object cannot assess the feasibility of a simple UI form extension or a business process extension without diving deeply into the implementation layer and going through documentation materials and tutorials for some provided Application Programming Interface (API).

Third, typical approaches lack declarative means to specify the allowed extension possibilities and their types for the different artifacts of the base application (e.g. new methods, attributes, UI elements, process artifacts, new columns in a database table, and the like). Fourth, when supporting extensibility on different layers, it is necessary to capture the dependencies between the extension possibilities available on these layers. In fact, tools are needed to express dependencies such as if the extension developer and/or extension object adds a new field of some UI form then the extension developer and/or extension object also needs to extend the respective Java class with a new attribute and the respective database table with a new column. The inter-layer dependencies impose constraints on the way extension possibilities are expressed and also on the way an extension is developed.

Fifth, typical approaches lack tools to specify how to extend (e.g., on the programming level) the base software. Sixth, existing approaches lack tools to express what artifacts or data of the core software can be accessed by the extension developer and/or extension object and the respective access rights (e.g., giving access to, limiting access to and/or preventing access to software assets). This covers, for example, the definition of class attributes of the core software application that are visible to the extension developer and/or extension object as well as methods that can be called by the extension developer and/or extension object when writing code for an extension. Finally, typical approaches do not specify when and where the extension code will be run (e.g., if the extension code be executed before or after some method of the base application).

Some approaches manually implement an extension interface through coding without specifying such interface explicitly. For example, the software provider can decide the interfaces or abstract classes for use as entry points for the extension developer and/or extension object. However, the support (e.g., loading and executing the code implementing these extension artifacts) may be manually implemented by the software provider. In this way, the technical realization of the extension interface gets coupled with the functional code of the base software. This manual approach increases the application complexity and makes software maintenance more difficult. As a result, the extensibility rationale, intents, and decisions taken by the application provider get lost.

Further, in this manual approach, the extension interfaces are not explicit in definition. As a result, the software provider may have difficulty (e.g., without a comprehensive and up-to-date documentation) finding the exact methods, classes, and interfaces that make-up the extension interface. In addition, an extension developer will have a hard time identifying the extension interface and the extension possibilities as they are not expressed explicitly. Instead, the extension developer will have to read documentation and tutorials and to understand the whole provided APIs to assess the feasibility of some extension scenario. This gets even more difficult as the functional API of the application and its extensibility API are mixed.

Accordingly, there is a need to address the aforementioned problems by introducing a system and a method for specifying and enforcing extension interfaces in multilayered software applications.

SUMMARY

One embodiment includes a method. The method includes generating at least one base object, and generating at least one extendable object associated with the base object, the extendable object defining an insertion point and is configured to enable addition of new functionalities to an application including the at least one base object.

Another embodiment includes a non-transitory computer-readable storage medium. The non-transitory computer-readable storage medium having stored thereon computer executable program code which, when executed on a computer system, causes the computer system to generate at least one base object, and generate at least one extendable object associated with the base object, the extendable object defining an insertion point and is configured to enable addition of new functionalities to an application including the at least one base object.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

Figure 1:
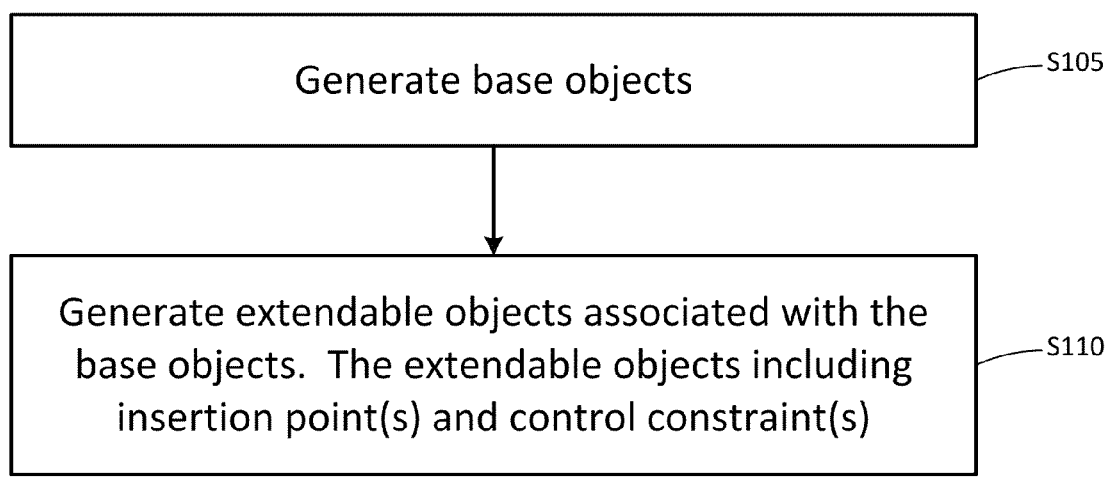
FIG. 1 illustrates a method according to at least one example embodiment.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the positioning of structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Figure 2:
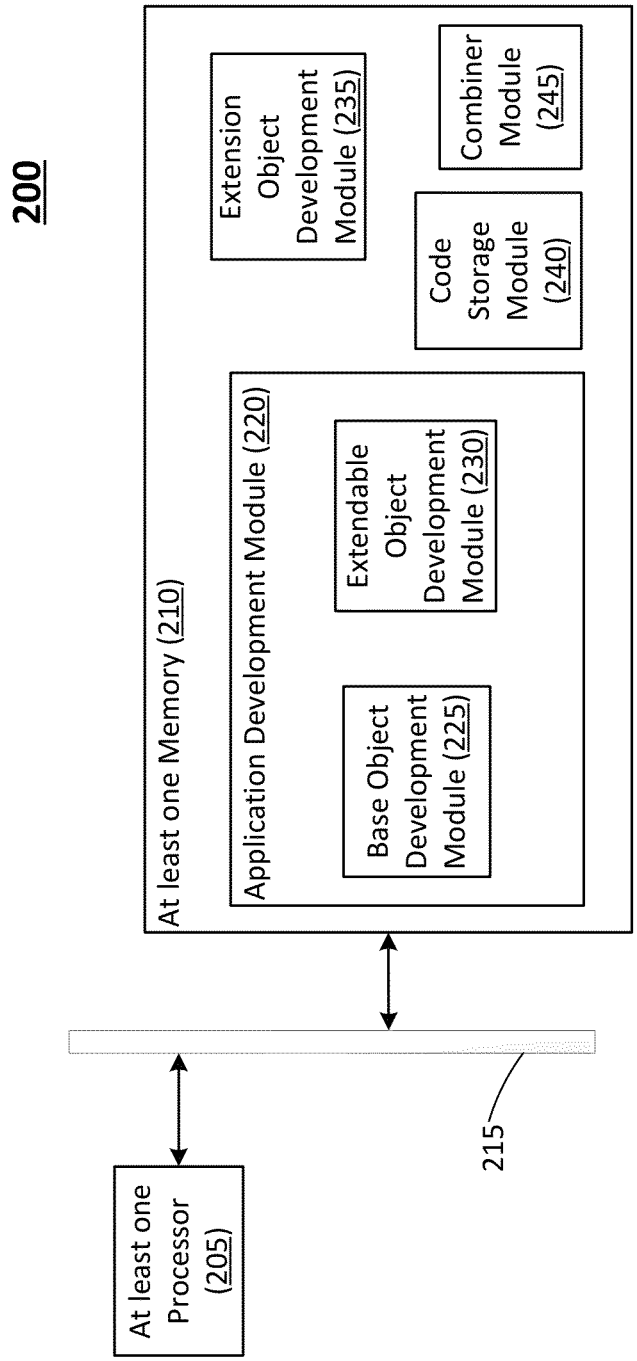
FIG. 2 illustrates a block diagram of a system according to at least one example embodiment.

FIG. 1 illustrates a method according to at least one example embodiment. The method steps described with regard to FIG. 1 may be executed as software code stored in a memory (e.g., at least one memory 210 described below) associated with a system (e.g., as shown in FIG. 2) and executed by at least one processor (e.g., at least one processor 205 described below) associated with the system. However, alternative embodiments are contemplated such as a system embodied as a special purpose processor.

For example, the method steps may be performed by an application-specific integrated circuit, or ASIC. For example, the ASIC may be configured as one or more of the blocks, or elements of the blocks, (e.g., the extendable object development module 230 described below) and/or the system 200.

Although the steps described below are described as being executed by a processor, the steps are not necessarily executed by a same processor. In other words, at least one processor may execute the steps described below with regard to FIG. 1.

As shown in FIG. 1, in step S105 a processor (e.g., at least one processor 205) generates base object(s) or at least one base object. Base objects may be associated with (or included in) an application (e.g., software application) configured to support a set of standard processes (e.g., core functionality or primary functions of the application). For example, base objects may be associated with applications (e.g., software applications) targeted for a large scale and a wide range of customers, such as business applications, and may be configured to support a set of standard business processes (e.g. sales order processing, recruitment, and the like). The base objects may be generated (e.g., by a software provider) in an integrated development environment (IDE) (e.g., Oracle JDeveloper, NetBeans, Microsoft Visual Studio, and the like) using a programming language (e.g., C++, visual basic, Java, and the like).

The IDE may implement some form of Aspect Oriented Programming (AOP). AOP complements object-oriented programming by facilitating another type of modularity that pulls together the widespread implementation of a crosscutting concern into a single unit. These units are termed aspects. The base objects may be objects that can not or should not be extended (e.g., add new functions). In other words, the base object is an object that is not configured to include extendable functionality. For example, in a sales order processing application or process, the base objects may include functions associated with taxes (e.g., tax calculations) that should not be modified.

In step S110 the processor generates extendable object(s), or at least one extendable object, associated with the base objects. For example, extendable objects may enable the addition of new functionalities to the base objects (e.g., as a software system) to support new requirements. For example, in a sales order processing application or process, the base objects may be extended to allow for approval of sales orders. The extendable objects may include insertion points. For example, a function (e.g., subroutine) may be extended by adding code following the execution of the function. The extendable objects may be generated (e.g., by a software provider) in an IDE. The IDE may be a same IDE as used for the base objects. Alternatively, or in addition to, the IDE may be a different IDE as used for the base objects.

In an example implementation, the extendable object may be marked for, define or include, an insertion point at least one of before a function, after a function and/or between a first and a second function. For example, in a sales order processing application or process, the base objects may include an add_new_order function and a new_order_confirmed function. The sales order processing application or process may be extended by adding an extendable object. The extendable object may be marked for, define or include, an insertion point between the add_new_order function and the new_order_confirmed function. Therefore, if a sales order approval extension is desired, code may be generated for a sales order approval routine and added at the insertion point between the add_new_order function and the new_order_confirmed function. However, example embodiments are not limited thereto. For example, a user interface (UI) insertion point may be defined and/or included.

In an example implementation, the extendable objects may include at least one control constraint. The control constraint may include attribute constraint(s) or at least one attribute constraint. For example, an access to an attribute (e.g., variable, object, function, data structure, and the like) may be limited (e.g., giving access to, limiting access to and/or preventing access to software assets). The access to an attribute may be group limited (e.g., by administrator, user, group of users (e.g., managers, third party developers), and the like). For example, attributes may be read-write, read-only, public, private, and the like. Therefore, if a sales order approval extension is desired, access to one or more attributes may be allowed or restricted. For example, the aforementioned sales order approval routine may only have access to a sales order number as a read-only variable. However, example embodiments are not limited thereto. For example, visibility and access rights to classes, methods, and/or the like may be limited through the use of a control constraint.

Example embodiments may generate/define the available extension points on, for example, different architectural layers of a base (or core) application, control the access and visibility of the base application (including the base object(s)) to the extension, constrains the interplay between extension points across, for example, different layers. One or more extension interfaces may be overlaid over the same base application. As a result, multiple extension developer and/or extension object views may co-exist. Further, a software provider may generate (e.g., automatically generate) the code and artifacts to provide and enforce the extension interface. Alternatively, or in addition to, the software provider may provide a manual implementation of the extension interface.

According to example embodiments, an artifact may be the result of any activity in the software life-cycle such as a requirement, an architecture model, a design specification, source code and test scripts. An artifact may also include a piece of information that is used or produced by a software development process. In addition, an artifact can be a model, a description, or software.

In a typical business software application, the software provider does not give the source code of an application to stakeholders (e.g., customers or partners) that may desire to develop extensions. However, the software provider may provide extension developers' access to artifacts such as API libraries, frameworks, and the like, as well as documentation, tutorials, and other materials to help an extension developer understand what extension possibilities exist, and how to develop and integrate extensions. The extensions are likely to interact with the core software (e.g. access internal data resources) and may affect the main execution stream. In the case of business applications, especially those that implement strict legal regulations (e.g. with respect to tax calculations), controlling extensibility is desirable if not necessary. For example, controlling extensibility may be necessary to prevent undesirable system behavior, data inconsistencies, and restrict access of extension developers and/or extension objects to sensitive system information.

According to example embodiments, two perspectives with regard to extensibility should be considered. The two perspectives are from the software provider perspective and from the extension developer perspective. For example, from the perspective of the software provider, an application typically consists of several logical layers (e.g. user interface (UI), business process, business object, database etc.) containing many artifacts that may be made extensible for the extension developer. However, in the context of complex software applications, a software provider may have several extension developer groups that can build extensions for the base software application. For example, the groups may include internal development teams in the same company that build a solution for a particular industry on top of a standard application, an external partner company (e.g., third party) that specializes in extending the standard software to support the needs of some domain, and/or the IT department of a customer organization that extends a standard software to cover their specific needs.

The software provider and the extension developer may require appropriate tools to express the extension interface. These tools for specifying extension interfaces should support the following constraints (or requirements):

R1—Multiple Extension interfaces: the software provider should be able to specify multiple extension interfaces for the same base software application;

R2—Extensible artifacts on multiple layers: specifying the available extension possibilities on the different layers of the core application (e.g., extension possibilities in UI forms, business process models, database tables, etc.) should be possible;

R3—Extension possibilities: specifying the types of extensions that are allowed on the application artifacts (e.g. new methods, attributes, UI elements, process artifacts, columns in a database table, etc.) should be possible;

R4—Extension interdependencies: specifying the relationships and constraints that exist between extension possibilities from different extensible artifacts should be possible;

R5—Extension method: specifying the required coding or configuration elements and how to extend these artifacts (e.g. inheritance, plug-ins etc.) should be possible;

R6—Extension control: specifying the resources of the base application that are available for the extension code (e.g. variables, methods, etc.) as well as their access rights and usage rules should be possible; and/or R7—Extension integration and execution: specifying when and where the extension code may run should be possible.

The constraints (e.g., R1-R7) should be specified as part of the extension interface. The extension developer, on the other hand, should understand the extension interface of the base software as well as correct usage of the extension interface to successfully develop and integrate an extension with the base software application.

Accordingly, example embodiments include a system configured to specify and enforce extension interfaces in multi-layered applications. The system may include modules, software and/or hardware providing a tool and a language for defining extension interfaces supporting different groups of extension developers, and a tool for enforcing extension interfaces through automatic code generation based on one or more strategies.

FIG. 2 illustrates a block diagram of a system according to at least one example embodiment. As shown in FIG. 2, the system (or apparatus) 200 includes at least one processor 205 and at least one memory 210. The at least one processor 205 and the at least one memory 210 are communicatively coupled via bus 215. The system 200 may be, for example, an element of a computing device (e.g., a cloud computing device, a server or a personal computer.

In the example of FIG. 2, the system 200 may be at least one computing device and should be understood to represent virtually any computing device configured to perform the methods described herein. As such, the system 200 may be understood to include various standard components which may be utilized to implement the techniques described herein, or different or future versions thereof. By way of example, the system 200 is illustrated as including the at least one processor 205, as well as the at least one memory 210 (e.g., a non-transitory computer readable storage medium) respectively.

Thus, as may be appreciated, the at least one processor 205 may be utilized to execute instructions stored on the at least one memory 210, so as to thereby implement the various features and functions described herein, or additional or alternative features and functions. Of course, the at least one processor 205 and the at least one memory 210 may be utilized for various other purposes. In particular, it may be appreciated that the at least one memory 210 may be understood to represent an example of various types of memory and related hardware and software which might be used to implement any one of the modules described herein. Systems and/or methods described below may include data and/or storage elements. The data and/or storage elements (e.g., data base tables) may be stored in, for example, the at least one memory 210.

As shown in FIG. 2, the at least one memory 210 includes an application development module 220, an extension object development module 235, a code storage module 240 and a combiner module 245. The application development module 220 includes a base object development module 225 and an extendable object development module 230.

The application development module 220 may be configured to generate base objects and extendable objects. The base objects and the extendable objects may be generated (e.g., by a software provider) using an IDE. Therefore, the application development module 220 may include and/or be associated with an IDE.

The base object development module 225 may be configured to generate base objects. For example, base objects may be associated with applications (e.g., software applications) targeted for a large scale and a wide range of customers, such as business applications, and may be configured to support a set of standard business processes (e.g. sales order processing, recruitment, and the like). The base objects may be objects that can not or should not be extended (e.g., add new functions). For example, in a sales order processing application or process, the base objects may include functions associated with taxes (e.g., tax calculations) that should not be modified.

The extendable object development module 230 may be configured to generate extendable objects associated with the base objects. For example, extendable objects may enable the addition of new functionalities to the base objects (e.g., as a software system) to support new requirements. For example, in a sales order processing application or process, the base objects may be extended to allow for approval of sales orders. The extendable objects may include insertion points. For example, a function (e.g., subroutine) may be extended by adding code following (or preceding) the execution of the function. The extendable objects may be generated (e.g., by a software provider) in an IDE.

For example, in a sales order processing application or process, the base objects may include an add_new_order function and a new_order_confirmed function. The sales order processing application or process may be extended by adding an extendable object. The extendable object may be marked for, define, and/or include an insertion point between the add_new_order function and the new_order_confirmed function.

In an example implementation, the extendable objects may include a control constraint(s). Control constraint(s) may include attribute constraint(s). For example, an access to an attribute (e.g., variable, object, function, data structure, and the like) may be limited. The access to an attribute may be group limited (e.g., by administrator, user, group of users (e.g., managers, third party developers), and the like). For example, attributes may be read-write, read-only, public, private, and the like. Therefore, if a sales order approval extension is desired, access to one or more attributes may be allowed or restricted. However, example embodiments are not limited thereto. For example, visibility and access rights to classes, methods, and/or the like may be limited through the use of a control constraint.

The extension object development module 235 may be configured to read an extendable object and show (e.g., on a display associated with system 200) all (or substantially all) of the insertion points associated with the extendable object. The extension object development module 235 may be configured to read an extendable object and show all (or substantially all) of the attribute constraints. In other words, the extension object development module 235 may be configured to generate a list based on the at least one extension object. The list may include the associated insertion point and the associated at least one attribute constraint. The list may be displayed on, for example, a display associated with system 200. The extension object development module 235 may be configured to show the insertion points (e.g., as a list of insertion points) and the attribute constraints (as a list of attribute constraints) together and/or separately. The extension object development module 235 may be configured to show the constraint associated with an attribute. For example, the extension object development module 235 may be configured to show an attribute as read-write, read-only, public, private, and the like.

The extension object development module 235 may be configured to provide an interface to add code as an extension of an object. Alternatively, or in addition to, the extension object development module 235 may include an IDE configured to generate and/or modify code as an extension of an object (or extension object). In other words, the extension object development module 235 may be configured to generate at least one extension object based on at least one extendable object in order to extend at least one function of the application. Accordingly, continuing the above example, if a sales order approval extension is desired, code may be generated (and/or added) for a sales order approval routine and added at the insertion point between the add_new_order function and the new_order_confirmed function.

The code storage module 240 may be configured to store code associated with the base object development module 225, the extendable object development module 230 and/or the extension object development module 235. For example, the code storage module 240 may be configured to store code (e.g., source code) associated with the base object development module 225, the extendable object development module 230 and/or the extension object development module 235. Further, the code storage module 240 may be configured to store source code after a combination operation performed by the combiner module 245. Still further, the code storage module 240 may be configured to store executable code generated by, a compiler (not shown) following the generation of an executable using the source code after a combination operation performed by the combiner module 245.

The combiner module 245 may be configured to combine code (e.g., source code) associated with the base object, the extendable object and the extension object. For example, the combiner module 245 may read code generated by the base object development module 225, the extendable object development module 230 and/or the extension object development module 235 and generate combined code. The combined code may become the source code that may be compiled as customized (e.g., customer specific) executable code for use by an end user customer.

Accordingly, example embodiments include a system and method to specify and enforce extension interfaces in multi-layered applications. The method may include defining an extension interface either separately or as part of the core software application, defining different extension interfaces for different kinds of extension objects for one software application, defining interdependent extension possibilities on artifacts from the same layer or from different layers of an application, controlling the access and usage permissions of extension developers and/or extension objects to the artifacts of the base software application, and manually implementing or automatically generating code and/or configuration artifacts to support and enforce the extension interface based on different strategies.

Figure 3:
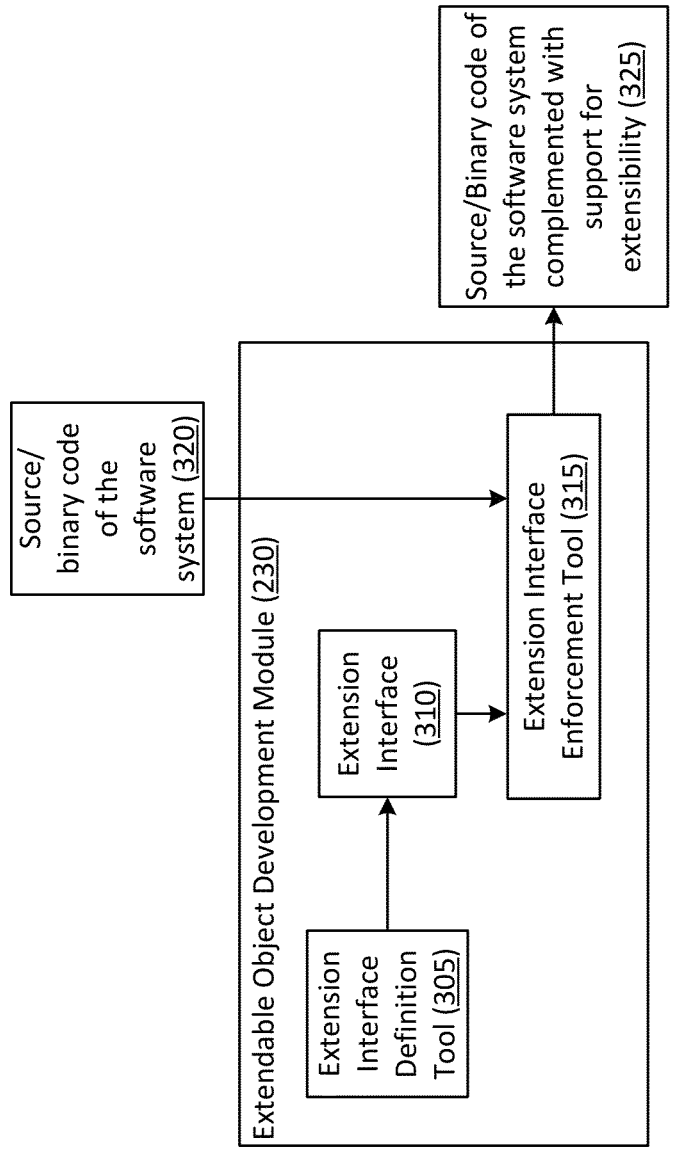
FIG. 3 illustrates a block diagram of a system according to at least one example embodiment.

FIG. 3 illustrates a block diagram of a system according to at least one example embodiment. As will be appreciated, the system 300 illustrated in FIG. 3 may be implemented as an element and/or an extension of the system 200 described above with regard to FIG. 2. As shown in FIG. 3, the system 300 includes the extendable object development module 230, a source/binary code of the software system block 320 and a source/binary code of the software system complemented with support for extensibility block 325. The extendable object development module 230 includes an extension interface definition tool 305, an extension interface 310 and an extension interface enforcement tool 315.

The source/binary code of the software system block 320 may be, for example the code (e.g., source code) generated by the base object development module 225. The source/binary code of the software system block 320 may be, for example the code (e.g., source code) stored in the code storage module 240. The extendable object development module 230 may read the source/binary code from the source/binary code of the software system block 320 as part of an initialization step for generating extension interface definitions.

The extension interface definition tool 305 may be configured to generate and/or define an extension interface 310. The extension interface definition tool 305 may be configured to generate/define different extension interfaces for different kinds of extension objects. For example, the extension interface 310 can include the definition of the application layers, the extensibility relevant artifacts, the extension possibilities that are offered on those artifacts, the inter-dependencies that exist between these extension points, and the access and usage rights of the extension developer and/or extension object to the artifacts of the base software system for each extension possibility. Further, the extension 310 interface may also specify the extension methods to be used and information about where and when the extension code will be executed.

The generation/definition of the extension interface can be separate from the base or core software system (e.g., using a textual language). Alternatively, or in addition to, the generation/definition of the extension interface can be part of the base or core software system source code (e.g., using comments or annotations in the source code). The extension interface definition tool 305 may also validates the extension interface definition.

The definition of the extension interface 310 may be done using a code editor associated with the extension interface definition tool 305. Further, the extension interface definition tool 305 may generate the definition of the extension interface 310 separately from the generating the source code of the base or core application (e.g., using the base object development module 225). For example, using the extension interface definition tool 305 (e.g., as a software editor), a software provider can define and generate the extension interface 310 such that the extension interface 310 supports a set of criteria or requirements (e.g., R1-R7 described above). In the extension interface 310, the software provider can specify the provided extension possibilities, interdependencies, supported extension types, and control constraints that are offered by the base software. One or more extension interfaces 310 can be defined for a software system.

The extension interface enforcement tool 315 takes as inputs the defined extension interface(s) 310 and the source code of the base software (e.g., from the source/binary code of the software system block 320), and the extension interface enforcement tool 315 generates the necessary code to provide those extension interfaces based on different strategies (such as aspect oriented programming and design patterns). Using the extension interface 310, an extension developer can identify the available extension possibilities and use the extension interface 310 as a guide to identify the right coding elements generated by the extension interface enforcement tool 315 to develop an extension.

The extension interface enforcement tool 315 generates the source/binary code of the software system complemented with support for extensibility block 325 based on the extension interface(s) 310 and the source/binary code of the software system block 320.

Within an extension interface 310, several layers (e.g., application layers) can be defined corresponding to the architectural layers of the base application. Each layer consists of one or more extensible artifacts that are made available to an extension developer and/or extension object. For example, each extension interface 310 may declare the base code artifacts that are extensible (e.g. classes, methods, components, etc.). According to example embodiments, extension possibilities within each artifact may be declared through an extension point. Extension artifacts may be viewed as containers of extension points. Each extension point may have a type and a set of parameters. The set of parameters may specify the base class artifacts to generate the appropriate extension interface. As a result, example embodiments may declare extension possibilities as first class entities and hence explicitly express extension possibilities.

Listing 1 (below) is an example extension interface for a business object layer of a business application. The extension interface declares the SalesQuote business object as an extensible artifact with the extension point EXP1 of type afterMethodCall that allows the extension developer and/or extension object to insert custom logic after the execution of the sendToApproval method.

Listing 1

```
1    extensioninterface example {
2       layer BusinessObject {
3          extensibieartifact "com.abc. SalesQuote " {
4             afterMethodCall EXP1 ("void sendToApproval( )")
                permission=per;
5
6             permissionset per{
7                attributepermission ("double total", READ) ;
8                methodpermission ("*",HIDDEN);}
9          }
10      }
11   }
```

Extension points can be further grouped within the same or a different layer via, for example, extension point groups. A group of extension points implies that the extension possibilities offered by these extension points are related. Groups may be used with or without control constraints. Control constraints on extensible artifacts and extension points may restrict the access, visibility, and/or usage of the base application artifacts by the extension developers and/or extension objects. The purpose of control constraints is to provide a fine grained access control of the extensions to the core application resources. For example, the example in Listing 1 shows a control constraint for EXP1 in the form of a permission set or (at least one) usage permission that allows the extension developer and/or extension object a READ access to the total attribute and hides all methods of the class from the extension developer and/or extension object.

The control constraints may also be defined on a group to control how an extension realizing the member extension points within a group should be implemented. In extension scenarios where an extension spans several layers (e.g. UI and business object) a valid extension may require the implementation of several extension points from the same or multiple layers.

As an example, the following describes extensions for business applications including three logical layers (e.g., a business process layer, a business object layer, and a UI layer), although example embodiments are not limited thereto. Listings including classes are shown as implemented in Java. However, example embodiments are not limited thereto. The example presents example constructs that can exist in business applications (e.g., the extensible artifacts, extension point types, and the like). However, example embodiments are not limited thereto. For example, in other possible constructs may be implemented in other multilayered application domains.

On the business object layer, the following types may be supported. AfterConstructor may enable the definition of extension-specific logic to be executed after the constructor of a business object. BeforeMethodCall and AfterMethodCall enable the definition of extension-specific logic before or after a certain method is called. AfterBOAttributeChange enables the definition of extension-specific logic to be executed after the value of a certain business object attribute changes. AllowNewBOLogic enables the definition of new business logic, for example, a new custom method that is not associated with the base logic of the business object. AllowBOAttributes enables the extension of a business object with a maximum number of attributes with a certain type.

On the UI layer, the following types may be supported. BeforeForm and AfterForm may enable extending the form flow of a certain application. BeforeForm and AfterForm may be used to insert a custom UI before or after a certain displayed UI. BeforeUIEventHandler and AfterUIEventHandler may enable the definition of custom logic to be inserted before or after a certain event handler is called. AllowUIAttributes may enable extending the data model of a UI with a maximum number of attributes of a certain type.

On the business process layer, more types may be supported. BeforeActivity, AfterActivity, and ParallelActivity may declare the possibility of extending an activity before, after, or parallel to a process (activity) execution. BeforeEvent and AfterEvent may allow the extension developer and/or extension object to insert an extension before or after an event. AfterDecision defines the possibility of inserting an extension after a certain decision result from a gateway. ExtensibleMessage may allow the extension of the message content or type used in the process (data extension). ExtensibleDecision may allow extending the result set of a gateway.

In the example, control constraints may be realized as permission sets which restrict the access, visibility, and usage rights of the base application resources (e.g., supports the principle of least privilege) to the extension developer and/or extension object. For example, the permission sets can be defined on the extensible artifact level (e.g., container level) and/or on the extension point level. Extension points may inherit the permission set of their container. An extension point that declares its own permission set, can further override or refine the permission set of its container.

For the business object and UI layers, permission sets may support method and attribute permissions of the extensible artifact. For example, attributes can be declared as either READ, WRITE, READWRITE or HIDDEN. Methods can be declared as CALLABLE or HIDDEN. Extensible artifacts that do not declare a permission set get the default extension and usage interface. The permission sets defined on the business process layer may define the visibility of the business process elements (e.g., activity, tasks, lanes, and data are currently supported). Each element may be declared as HIDDEN or VISIBLE to an extension developer and/or extension object.

In the example, one control constraint, ExtendAll, requiring that a valid extension should provide an extension for all extension points within the group may be supported. For example, requiring an extension developer and/or extension object to extend the data model of the business object when adding a new input text field for a UI may be supported. In the example, expressing whether the extension code will be executed on the client side, the server side, or on another system (such as a third-party cloud system) may be supported. For example, using keywords Client, Server, Other may define where the extension code will be executed.

As another example, the following describes extensions for business applications including three logical layers (e.g., a business process layer, a business object layer, and a UI layer), although example embodiments are not limited thereto. Listings including classes are shown as implemented in Java. However, example embodiments are not limited thereto. The example presents example constructs that can exist in business applications (e.g., the extensible artifacts, extension point types, and the like). However, example embodiments are not limited thereto. For example, in other possible constructs may be implemented in other multilayered application domains.

Figure 7:
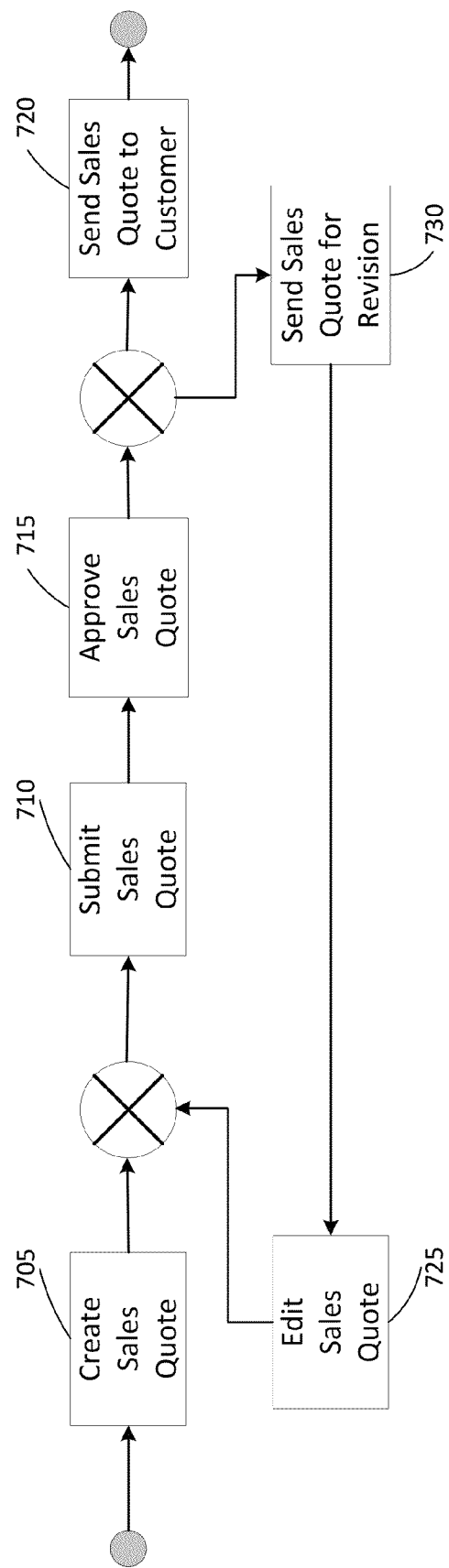
FIG. 7 illustrates a block diagram of a signal flow according to at least one example embodiment.

This example extends a sales quote business object as shown in FIG. 7. According to FIG. 7, a sales quotation management module is illustrated as an example of a multi-layered business application. FIG. 7 shows a sales quotation business process (e.g., a business process layer). The process starts upon receiving a request for a quotation for a specific set of products from a customer. A sales representative analyzes the request and creates a sales quotation (block 705) and fills in the necessary data. Then, the sales representative sends the quotation for approval (block 710) to a manager. The manager can either approve the quotation (block 715) or request a revision (block 730). Based on that decision, the sales representative may edit the quotation (block 725) and resubmit the quotation for approval (block 710). At the end, the approved sales quotation is sent to the inquiring customer (block 720).

In this example, external developers, who are allowed to perform some custom logic before a SalesQuote business object is saved, but are not allowed to modify any attribute. This group of extension developers and/or extension objects may also be allowed to read all attributes of the SalesQuote and display a message in a label with the outcome of their logic in a SalesQuotation form. Further, this group may not see any method of the SalesQuote business object. Listing 2 (below) shows a specification for the extension interface for an example extension developer and/or extension object group. This extension interface spans two layers (e.g., business object and UI).

---
Listing 2
---
```
1   extensioninterface externaldeveloper {
2
3   layer BusinessObject {
4      extensibleartifact "com.abc.SalesQucte" permission=default1 {
5      beforeMethodCall EPBO1 ("void saveSalesQuote ( ) "); }
6
7      permissionset default1 {
8         attributepermission ( " * ", READ) ;
9         methodpermission (" - ", HIDDEN) ;
10        }}
11
12  layer UserInterface {
13     extensibleartifact "com.abc.SalesQuoteForm"
           permission=default2 {
14     allowUIComponent EPUI1 ("JLabel", "salesQuotePanel ") ; }
15
16     permissionset default2 {
17        attributepermission (" * ", HIDDEN) ;
18        methodpermission (" * ", HIDDEN) ;
19        }}
20
21     Group extensionScenario {(EPBO1, EPUI1), ExtendAll}; }
```

As shown in Listing 2, Line 1 declares the external developer extension interface. Line 3 declares the business object and Line 12 declares the UI as the containers of extensible artifacts. In this example, there are two artifacts declared as being extensible which are com.sap.SalesQuote and com.sap.SalesQuoteForm (Line 4 and Line 13). Extension possibilities may be defined through extension points. Each extension point may have a type, a unique identifier (e.g., EPBO1), a set of parameters, and/or a reference to a permission set.

Line 5 shows the declaration of the extension point EPBO1 of type beforeMethodCall and Line 14 shows the extension point EPUI1 of type allowUIComponent. The parameters of EPBO1 may declare the extension possibility before the method saveSalesQuote( ). The parameters of EPUI1 may specify that the extension developer and/or extension object can add a new component of type JLabel on the parent component salesQuotePanel. The SalesQuote business object artifact has a reference to the artifact permission set default1 (Lines 7-10). This permission set may declare that all attributes should be available only in READ mode and methods should be hidden to all extension points within the artifact. The SalesQuoteForm UI artifact has a reference to the artifact permission set default2 (Lines 16-19). This permission set may declare all attributes and methods to be hidden from the extension developer and/or extension object.

The last part of the interface (Line 21) declares a group called extensionScenario that contains two extension points EPBO1 and EPUI1. This may indicate that the two extension points are related. At the end of the group declaration, an ExtendAll constraint is declared, indicating that a valid extension should extend both extension points.

As still another example, the following describes extensions for business applications including three logical layers (e.g., a business process layer, a business object layer, and a UI layer), although example embodiments are not limited thereto. Listings including classes are shown as implemented in Java. However, example embodiments are not limited thereto. The example presents example constructs that can exist in business applications (e.g., the extensible artifacts, extension point types, and the like). However, example embodiments are not limited thereto. For example, in other possible constructs may be implemented in other multilayered application domains.

In the example a group of extension developers and/or extension objects, working on the provider side to realize industry-specific solutions on top of the standard application. These extension developers and/or extension objects may be allowed to define extensions that span multiple layers. More specifically, these extension developers and/or extension objects may be allowed to extend the business process after the approval step, for example, to realize a second approval step. Accordingly, some relevant business process activities should be made visible while hiding the rest of the process details. Further, these extension developers and/or extension objects may also be allowed to extend the SalesQuote business object with new attributes and extend the business object logic after the SalesQuote has been sent for approval. The extension developers and/or extension objects may also be allowed to read and write values to the attributes products and customerInfo as well as to call the method calculateTotal. Listing 3 (below) shows a specification for the extension interface for an example extension developer and/or extension object group.

---
Listing 3
---
```
1   extensioninterface    internaldeveloper {
2
3   layer BusinessObject   {
4      extensibleartifact    "com.abc.SalesQuote"
           permission=defview {
5      allowBOAttributes EPBO1    ("String", 10) ;
6      afterMethodCall EPBO2 ("void sendToAppr ( )") permission=
           intdev;
7
8   permissionset intdev{
9      attributepermission    ("products", READWRITE};
10        attributepermission    {"customerInfo", READ WRITE) ;
11        methodpermission    {"calculateTotal", CALLABLE) ;
12     }}
13
14  permissionset defview   {
15        attributepermission   ( " * ", READ) ;
16        methodpermission (" * ", HIDDEN};
17     }}
18
19  layer UserInterface   {
20        extensibleartifact    "com.abc.SalesQuoteForm" permission=
           defview {
21        allowUIComponent EPUI1    ("JPanel", "approvalPanel") ;
22     }
23
24  permissionset defview {
25        attributepermission (" * ", HIDDEN) ;
26        methodpermission (" * ", HIDDEN) ;
27     }}
28
29  layer BusinessProcess {
30        extensibleartifact    "sales_quotation.bpmn" permission=
           defview {
31        afterActivity EPBP1 permission = view
32           ("Approve Sales Quote" , "com.abc.SQProcessing"
33              , "void approveQuote ( ) ") ;
34
35  permissionset view{
36        activitypermission ("Create Sales Quote", VISIBLE) ;
37        activitypermission ("Approve Sales Quote", VISIBLE);
38        activitypermission ("Send Sales Quote", VISIBLE);
39     }}
40
41  permissionset defview{
42        lanepermission ("Sales Quotation Processing", HIDDEN);
43     }}
44
```

Listing 3

```
45  Group extensionScenario  {(EPUI1, EPBP1, EPB02),
    ExtendAll}; }
```

In this example of an extension interface, there are three layers defined (business object, UI, and business process). In business object layer (Lines 3-17), the SalesQuote business object is declared as extensible. The permission set defview expresses that the extension developer and/or extension object cannot call any method, and has a read only access to all attributes (Lines 14-17). There are two extension points defined (Lines 5-6) EPBO1 and EPBO2, which declare two extension possibilities to allow the addition of a maximum of 10 new attributes of type String (that will be persisted in the database) and to extend the logic after the sendToApproval( ) method. EPBO2 has a reference to permission set intdev (that refines the permission set of the parent), which allows a read/write access to the attributes products and customerInfo, and allows the method calculateTotal( ) to be called (Lines 8-12).

The next part of the example extension interface (Lines 19-27) declares the SalesQuoteForm as extensible with the allowUIComponent extension possibility EPUI1 that allows the extension developer and/or extension object to add a new panel in the sales quote approval panel. The artifact permission set defview hides all methods and attributes of the class from the extension developer and/or extension object. The following part (Lines 29-43) defines the business process layer and the sales quotation business process as an extensible artifact. The EPB1 extension point declares the possibility of adding an activity after the sales quote approval activity and the underlying class SQProcessing that processes the logic of the activity through the method approveQuote( ). The defview permission set declares the whole lane that contains the sales quotation business process as hidden (Lines 41-43). The permission set view referenced by EPBP1 makes the main activities of the business process visible to the extension developer and/or extension object.

The last part of the example extension interface (Line 45) declares a group called extensionScenario that contains three extension points EPUI1, EPBP1, and EPBO2. This requires the extension developer and/or extension object to extend all extension points.

As yet another example, the following describes the extension interface enforcement tool 315. The extension interface enforcement tool 315 may use aspect-oriented programming as default enforcement strategy. In other words, the extension interface enforcement tool 315 may generate separate aspect code in order to provide and enforce the defined extension interfaces. Other enforcement strategies such as design patterns may also partly supported.

The code generated from an extension interface (e.g., extension interface 310), using a default strategy, may consist of three main parts. The parts may include a generated interface (e.g., an interface written in Java) which acts as an entry point for the extension developer and/or extension object, a proxy class that controls the access, visibility, and usage rights of the methods, and attributes of the base class (e.g., the proxy class that will be passed to the class of the extension developer and/or extension object implementing the interface and may be initialized once an extension is loaded), and an aspect code, which injects into the base application the necessary logic for supporting the execution of the implemented extension (e.g., the aspect code enriches the base class with methods and data structures necessary to load and initialize an implemented extension in a plug-in like fashion). Listing 4 (below) shows a code framework for the extension interface enforcement tool.

Listing 4

```
 1  // *************** Generated Interface
                      ********************
 2
 3  public interface ExtensionScenarioInterface
 4
 5  //these are the methods the extender has to implement
 6  public void init (EPBOlProxy p1, EPUIlProxy p2);
 7  public void yourEPBO1Logic ( ) ;
 8  public JLabel yourEPU11JLabel ( );
 9  ... }
10
11      // *************** Generated proxy classes
                      *****************
12
13  public class EPBOlProxy {
14      private SalesQuote salesquote;
15          ...
16      //getter methods for the READ attributes
17      public CustomerInfo getCustomerInfo ( ) {
18          return salesquote.getCustomerInfo (this) ;
19      }
20      public List<ProductQuote> getProductQuote ( ) {... }
21      public String getComment ( ) {...}
22      public double getDiscount ( ) {...}
23          ... }
24
25  public class EPUIlProxy {
26  //empty since no access has been granted
27  }
28
29  // *************** Generated Aspects *********************
30
31  public privileged aspect EPBOlAspect {
32
33  /*Datastructure to hold
34      extensions of type ExtensionScenarioInterface*/
35  private ArrayList<ExtensionScenarioInterface>
36          SalesQuote.EPB01Extensions;
37
38  //New method in SalesQuote class to add the extensions
39  private void SalesQuote.loadExtensionScenarioExtensions ( ) {
40  ...
41  //loads the extensions with class loader
42  ...
43      extensions, init (this.getEPBOlProxy ( ), this.getEPUIlProxy ( )) ;
44      EPBOlExtensions.add(extension);
45          ... }
46
47  //New method in SalesQuote class to perform
48  //EPBOl extension sanity checks
49  private void SalesQuote.sanityChecksEPBOl ( ) {...}
50
51  //Mew method in SalesQuote class to get the EPBOl proxy
52  private EPBOlProxy SalesQuote.getEPBOlProxy ( ) {
53      return new EPBOl Proxy (this); }
54
55  //New methods to support the proxy access to the base class
56  public Customerinfo
57          SalesQuote. getCustomerInfo (EPBO1Proxy proxy) {
58          //validate the proxy and return
59          if (isLegalProxy (proxy)) return this.customer Info;
60          else return null;
61      }
62
63  public list <ProductQuote >
64          SalesOuote.getProducts(EPBO1Proxy proxy) {. . .}
65  //Similarly for the rest of the attributes . . .
66
67  //load the extensions and
68  //perform sanity checks in constructor constructor
69  pointcut onload ( ) : execution (* SalesQuote.new (..));
70  after(SalesQuote s) : onload ( ) && this(s) {
71  s. loadExteiisionScenarioExtensions( ) ;
```

-continued

Listing 4

```
72    s.santyChecksEPBOl( ); }
73
74   //Pointcut and advice for running the EPBOl extension
75   pointcut extension( ) : execution(* SalesQuote.saveSalesQuote(. . .));
76   before(SalesQuote s) : extension ( ) && this(s) {
77
78   if(s.EPBOlExtensions != null)
79   {
80      for (int i=0; i<s.EPBOlExtensions.size( ); i++)
81      {
82         s.EPBOlExtensions.get(i).yourEPBOlLogic( );
83      }
84   }}...}
85
86   public privileged aspect EPUI1Aspect    {
87   ...
88   //Aspect body similar to the EPBO1Aspect
89   ...
90   //Pointcut and advice for running the EPUI1 extension
91   pointcut extension( ) : execution (* SalesQuoteform.new(..));
92   after(SalesQuoteForm s) : extension( ) && this(s)
93      if (s.EPUI1Extensions !=null)
94   }
95      for (int i=0; i<s.EPBOlExtensions.size( ); i++)
96      {
97         JLabel j = s.EPBOlExtensions.get(i).yourEPUI1JLabel( );
98         s.salesQuotePanel.add(j);
99      }
00   }}}...
```

In this example, Lines 3-9 (of listing 4) show the generated extension interface. The extension interface includes two parts. The first part is needed by the code framework to initialize the extension (Line 6). Moreover, a reference to the corresponding proxy classes is provided that may be used by the developer during the implementation of the extension. The second part is the extension point specific part: The extension developer and/or extension object may implement the method yourEPBO1Logic( ) for the extension point EPBO1 and the method yourEPUI1JLabel( ) for the extension point EPUI1.

The EPBO1 proxy class (Lines 13-23) contains the generated list of getter methods required to provide a READ access to the SalesQuote class attributes. Note that no setter methods have been generated and no methods have been exposed as defined in the permission set default1 (Listing 3, Lines 7-10). The proxy class generated for EPUI1 is empty since all methods and attributes were declared as hidden by the permission set default2 (Listing 3, Lines 16-19). The last part of the code framework generated is the aspect code for EPBO1 (Lines 31-84) and EPUI1 (86-100).

In the EPBO1 aspect, the first part (Lines 35-53) of the aspect code are inter-type declarations, which enrich the base class with data structures and methods necessary to load the extensions implementing the ExtensionScenarioInterface in a plug-in like fashion (e.g., the extensions of type ExtensionScenarioInterface may be loaded with a class loader and they are passed an instance of the proxy). The second part of the aspect code (Lines 56-65) enriches the base class in a similar fashion with methods to support the proxy class EPBO1Proxy calls. The last part of the aspect (Lines 69-84) generates the advice that will load the extension after the constructor (e.g., trigger the plug-in load mechanism) of the SalesQuote business object, and the saveSalesQuote( )method pointcut within the base class where the extension code will run as well as the advice that will run the extension code. The EPUI1 aspect contains a similar body to the EPBO1 aspect, however the generated pointcut and advice (Lines 91-100) will add the JLabel component from the extension to the salesQuotePanel.

Transitioning to a method related to defining/generating an extension interface, according to example embodiments, the software provider may first develop the software system while focusing mainly on the functional aspects. During this process, the software provider may not enhance the source code of the software system with any code associated with enforcing and realizing extensibility. Then, the software provider may use a tool (e.g., the extension interface definition tool 305) to define different extension interfaces for different kinds of extension objects. Finally, the software provider can either implement the extension interface manually. Alternatively, or in addition to, the software provider can use an interface enforcement tool (e.g., the extension interface enforcement tool 315).

Figure 4:
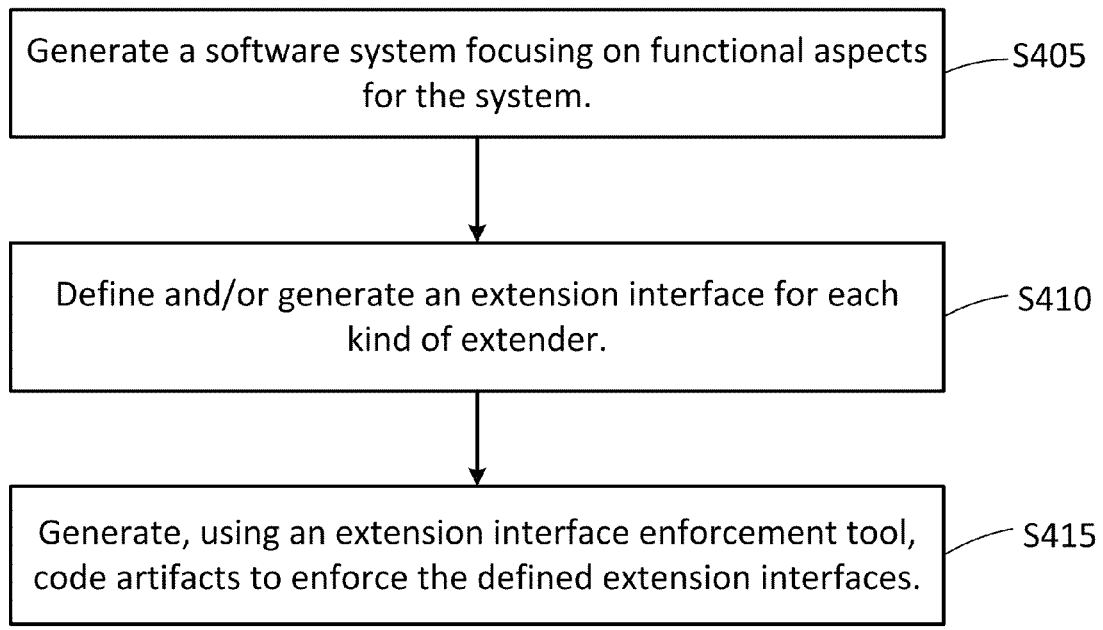
FIG. 4 illustrates another method according to at least one example embodiment.

FIG. 4 illustrates another method according to at least one example embodiment. The method steps described with regard to FIG. 4 may be executed as software code stored in a memory (e.g., at least one memory 210) associated with a system (e.g., as shown in FIG. 2) and executed by at least one processor (e.g., at least one processor 205) associated with the system. However, alternative embodiments are contemplated such as a system embodied as a special purpose processor. For example, the method steps may be performed by an application-specific integrated circuit, or ASIC. For example, the ASIC may be configured as one or more of the blocks, or elements of the blocks, (e.g., the extendable object development module 230) and/or the system 200. Although the steps described below are described as being executed by a processor, the steps are not necessarily executed by a same processor. In other words, at least one processor may execute the steps described below with regard to FIG. 4.

As shown in FIG. 4, in step S405 a processor (e.g., at least one processor 205) generates a software system focusing on functional aspects for the system. For example, generating functional aspects for the system may include generating base objects associated with the system. As discussed above, base objects may be associated with applications (e.g., software applications) targeted for a large scale and a wide range of customers, such as business applications, and may be configured to support a set of standard business processes (e.g. sales order processing, recruitment, and the like). The base objects may be objects that can not or should not be extended (e.g., add new functions). For example, in a sales order processing application or process, the base objects may include functions associated with taxes (e.g., tax calculations) that should not be modified.

In step S410 the processor defines and/or generates an extension interface for each kind of extension object. For example, extendable objects may enable the addition of new functionalities to the base objects (e.g., as a software system) to support new requirements. For example, in a sales order processing application or process, the base objects may be extended to allow for approval of sales orders. The extendable objects may include insertion points. For example, a function (e.g., subroutine) may be extended by adding code following the execution of the function. The extendable objects may be generated (e.g., by a software provider) in an IDE. The IDE may be a same IDE as used for the base objects. Alternatively, or in addition to, the IDE may be a different IDE as used for the base objects.

The extension interface can include the definition of the application layers, the extensibility relevant artifacts, the extension possibilities that are offered on those artifacts, the inter-dependencies that exist between these extension points, and the access and usage rights of the extension developer and/or extension object to the artifacts of the core software system for each extension possibility. Moreover, the extension interface can also specify the extension methods to be used and information about where and when the extension code will be executed.

Within an extension interface, several layers (e.g., application layers) can be defined corresponding to the architectural layers of the base application. Each layer may include one or more extensible artifacts that are made available to an extension developer and/or extension object. According to example embodiments, as discussed above, extension possibilities within each artifact may be declared through an extension point and/or containers of extension points. Each extension point may have a type and a set of parameters.

Extension points can be further grouped within the same or a different layer via, for example, extension point groups. A group of extension points indicates that the extension possibilities offered by these extension points are related. An extension interface may include control constraints. As discussed above, control constraints on extensible artifacts and extension points may restrict the access, visibility, and/or usage of the base application artifacts by the extension developers and/or extension objects.

The control constraints may also be defined on a group to control how an extension realizing the member extension points within a group should be implemented. In extension scenarios where an extension spans several layers (e.g. UI and business object) a valid extension may require the implementation of several extension points from the same or multiple layers. For example, control constraints may be realized as permission sets which restrict the access, visibility, and usage rights of the base application resources (e.g., supports the principle of least privilege) to the extension developer and/or extension object. For example, the permission sets can be defined on the extensible artifact level (e.g., container level) and/or on the extension point level. Extension points may inherit the permission set of their container. An extension point that declares its own permission set, can further override or refine the permission set of its container.

For the business object and UI layers, permission sets may support method and attribute permissions of the extensible artifact. For example, attributes can be declared as either READ, WRITE, READWRITE or HIDDEN. Methods can be declared as CALLABLE or HIDDEN. Extensible artifacts that do not declare a permission set get the default extension and usage interface. The permission sets defined on the business process layer may define the visibility of the business process elements (e.g., activity, tasks, lanes, and data are currently supported). Each element may be declared as HIDDEN or VISIBLE to an extension developer and/or extension object.

As described in an example above, extensions for business applications including a business process layer may include several types of extension interfaces. For example, BeforeActivity, AfterActivity, ParallelActivity, BeforeEvent, AfterEvent, AfterDecision, ExtensibleMessage, and/or ExtensibleDecision may be supported.

As described in an example above, extensions for business applications including a business object layer may include several types of extension interfaces. For example, AfterConstructor, BeforeMethodCall, AfterMethodCall AfterBOAttributeChange, AllowNewBOLogic, and/or AllowBOAttributes may be supported.

As described in an example above, extensions for business applications including a UI layer may include several types of extension interfaces. For example, BeforeForm, AfterForm, BeforeUIEventHandler, AfterUIEventHandler, and/or AllowUIAttributes may be supported.

In step S415 the processor generates, using an extension interface enforcement tool, code artifacts to enforce the defined extension interfaces. For example, the extension interface enforcement tool 315 may be used to generate the code artifacts. In generating the code artifacts, the extension interface enforcement tool 315 may only expose artifacts linked to the defined extension interfaces. As a result, an extension developer and/or extension object can only be added based on the exposed artifacts. For example, the software provider may choose an enforcement strategy (e.g., using Aspect-Oriented Programming, using Design patterns, using Proxies, and the like) and the software provider may provide inputs to the interface enforcement tool. For example, the inputs may include a defined extension interfaces and/or a source or binary code of the core software system. As output the interface enforcement tool may enhance the code of the base system with code to provide and enforce the defined extension interfaces. The extensibility enforcement code can be generated as part of the base system source code and/or as a separate module (e.g., when using aspect-oriented programming techniques).

Alternatively, or in addition to, the code artifacts to enforce the defined extension interfaces may be enforced manually. For example, the software provider may manually write similar code to the generated code (e.g., using aspect code, design patterns, or some additional proxy classes) that exposes the extension possibilities defined in the extension interface to the extension developer and/or extension object.

Once the base software system is developed with complimentary support for extensibility (e.g., a base software system with defined (and enforced) extension interfaces), extension objects may be developed to refine the software based on, for example, a customer's needs. The three objects (e.g., base software object(s), extension interface object(s) and extension object(s)) can be combined as a finished software object to be used by the customer (e.g., following a compilation of the finished software object).

Figure 5:
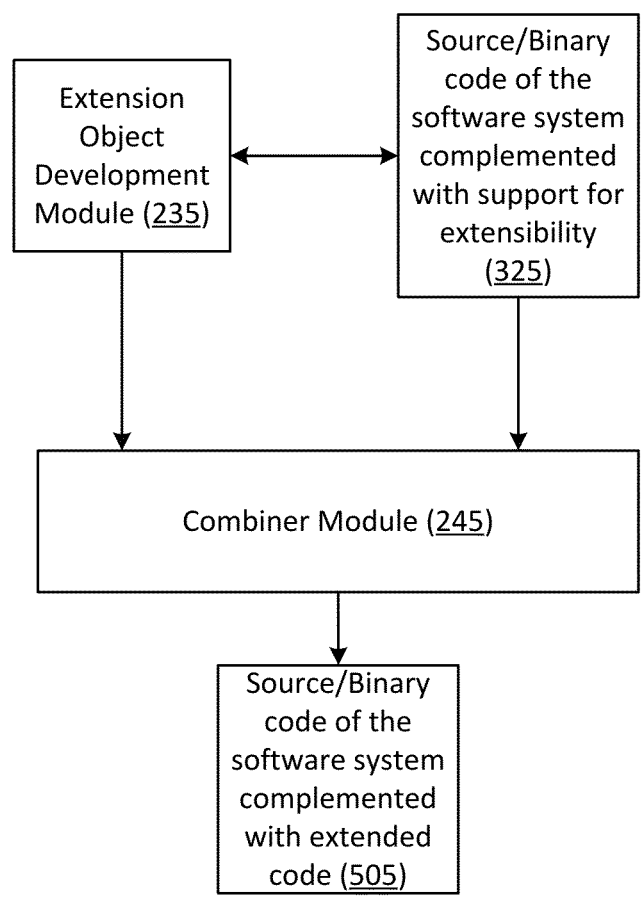
FIG. 5 illustrates a block diagram of a system according to at least one example embodiment.

FIG. 5 illustrates a block diagram of a system according to at least one example embodiment. As will be appreciated, the system 500 illustrated in FIG. 5 may be implemented as an element and/or an extension of the system 200 described above with regard to FIG. 2. Alternatively, or in addition to, the system 500 illustrated in FIG. 5 may be implemented in a separate system from system 200 (e.g., a third party developer system) having some or all of the features described above with regard to system 200. As shown in FIG. 5, the system 500 includes the extension object development module 235, the source/binary code of the software system complemented with support for extensibility block 325, the combiner module 245, and a Source/Binary code of the software system complemented with extended code block 505.

The extension object development module 235 may be configured to read an extendable object and show (e.g., on a display associated with system 200) all (or substantially all) of the insertion points associated with the extendable object. The extension object development module 235 may be configured to read an extendable object and show all (or substantially all) of the attribute constraints. The extension object development module 235 may be configured to show the insertion points and the attribute constraints together and/or separately.

The extension object development module 235 may be configured to show the constraint associated with an attribute. For example, the extension object development module 235 may be configured to show an attribute as read-write, read-only, public, private, and the like. The extension object development module 235 may be configured to provide an interface to add code as an extension of an object. Alternatively, or in addition to, the extension object development module 235 may include an IDE configured to generate and/or modify code as an extension of an object.

As shown in FIG. 3, the source/binary code of the software system complemented with support for extensibility block 325 is generated by the extension interface enforcement tool 315 based on the extension interface(s) 310 and the source/binary code of the software system block 320.

The combiner module 245 may be configured to combine code (e.g., source code) associated with the base object, the extendable object and the extension object. For example, the combiner module 245 may read code generated by the base object development module 225, the extendable object development module 230 and/or the extension object development module 235 and generate combined code. The combined code may be the Source/Binary code of the software system complemented with extended code block 505 which may be compiled as customized (e.g., customer specific) executable code for use by an end user customer.

Figure 6:
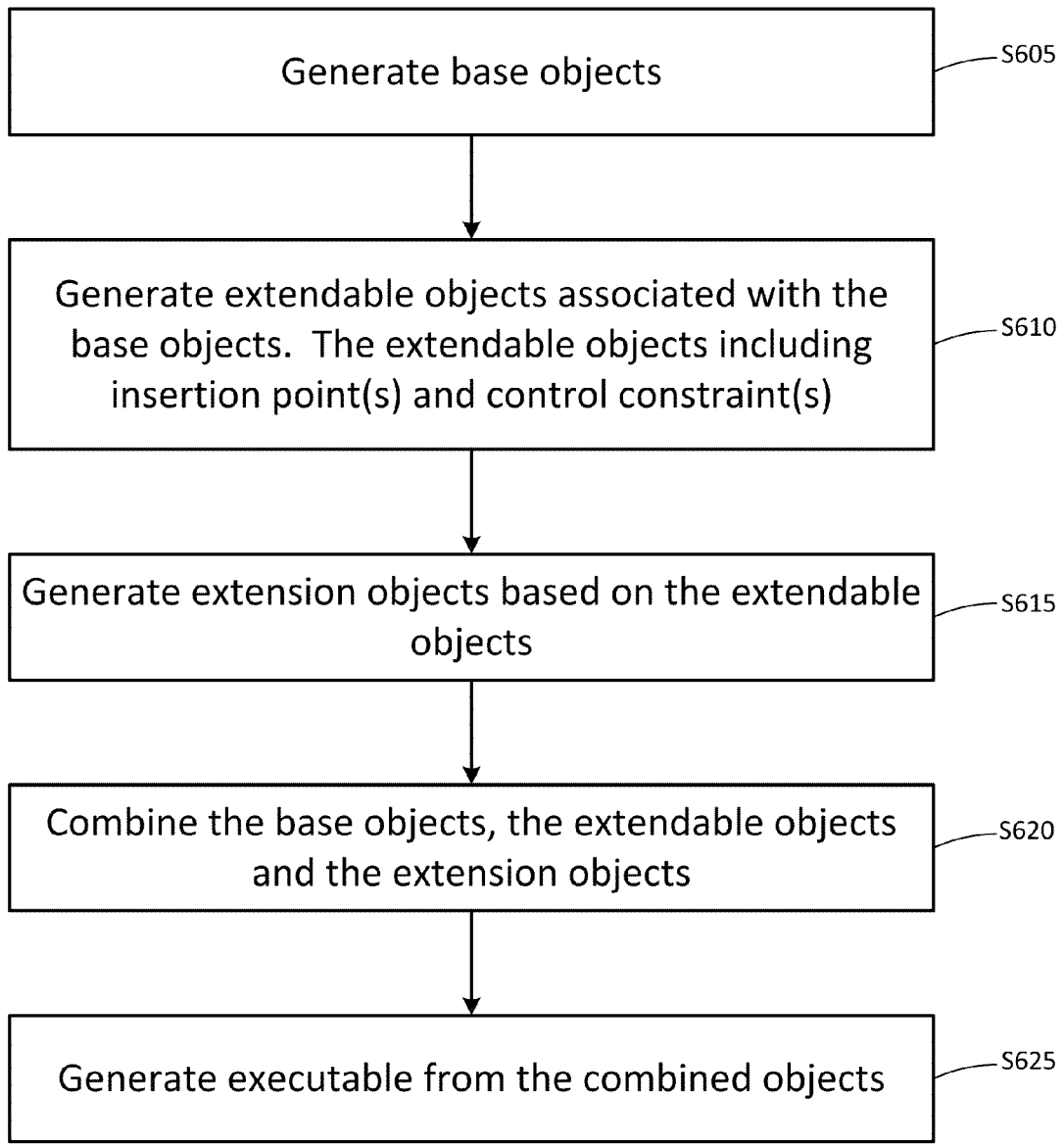
FIG. 6 illustrates still another method according to at least one example embodiment.

FIG. 6 illustrates still another method according to at least one example embodiment. The method steps described with regard to FIG. 6 may be executed as software code stored in a memory (e.g., at least one memory 210) associated with a system (e.g., as shown in FIG. 2) and executed by at least one processor (e.g., at least one processor 205) associated with the system. However, alternative embodiments are contemplated such as a system embodied as a special purpose processor.

For example, the method steps may be performed by an application-specific integrated circuit, or ASIC. For example, the ASIC may be configured as one or more of the blocks, or elements of the blocks, (e.g., the extendable object development module 230) and/or the system 200. Although the steps described below are described as being executed by a processor, the steps are not necessarily executed by a same processor. In other words, at least one processor may execute the steps described below with regard to FIG. 6.

As shown in FIG. 6, in step S605 a processor (e.g., at least one processor 205) generate base object(s). As discussed above, base object(s) may be associated with applications (e.g., software applications) targeted for a large scale and a wide range of customers, such as business applications, and may be configured to support a set of standard business processes (e.g. sales order processing, recruitment, and the like). The base object(s) may be objects that can not or should not be extended (e.g., add new functions). For example, in a sales order processing application or process, the base objects may include functions associated with taxes (e.g., tax calculations) that should not be modified.

The base object(s) may be generated (e.g., by a software provider) in an integrated development environment (IDE) (e.g., Oracle JDeveloper, NetBeans, Microsoft Visual Studio, and the like) using a programming language (e.g., C++, visual basic, Java, and the like). The IDE may implement some form of Aspect Oriented Programming (AOP). AOP complements object-oriented programming by facilitating another type of modularity that pulls together the widespread implementation of a crosscutting concern into a single unit. These units are termed aspects. The base objects may be objects that can not or should not be extended (e.g., add new functions). Base objects are described above in more detail and will not be discussed further for the sake of brevity.

In step S610 the processor generates extendable object(s) associated with the base object(s). The extendable object(s) may include insertion points and attribute constraints. For example, extendable objects may enable the addition of new functionalities to the base objects (e.g., as a software system) to support new requirements. For example, in a sales order processing application or process, the base objects may be extended to allow for approval of sales orders. The extendable objects may include insertion points. For example, a function (e.g., subroutine) may be extended by adding code following the execution of the function. The extendable objects may be generated (e.g., by a software provider) in an IDE. The IDE may be a same IDE as used for the base objects. Alternatively, or in addition to, the IDE may be a different IDE as used for the base objects. Extendable objects as, for example, an extension interface, insertion points and attribute constraints are described above in more detail and will not be discussed further for the sake of brevity.

In step S615 the processor generates extension object(s) based on the extendable object(s). The extension object(s) may be code generated as an extension of an object. The code may add functionality to the base object as allowed by an extension interface.

In step S620 the processor combines the base objects, the extendable objects and the extension objects. For example, as discussed above, the combiner module 245 may read code generated by the base object development module 225, the extendable object development module 230 and/or the extension object development module 235 and generate combined code. The combined code may become the source code that may be compiled as customized (e.g., customer specific) executable code for use by an end user customer.

In step S625 the processor generates an executable from the combined objects. For example, the processor may compile the code generated in step S620 using any known compiler.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A computer implemented method, comprising:
generating at least one base object; and
generating at least one extendable object associated with the base object,
the at least one extendable object defining an insertion point and is configured to enable addition of new functionalities to an application including the at least one base object, and
the at least one extendable object including an extension interface defined separately from the generating of the at least one base object, the extension interface being configured to define a plurality of application layers corresponding to architectural layers of the at least one base object, each of the plurality of application layers including at least one extensible artifact exposed to an extension developer, the extension interface including at least one control constraint configured to,
restrict an access to the at least one base object by an extension developer,
restrict a visibility of the at least one base object, as being hidden or visible, by the extension developer, and
restrict a usage right of the at least one base object by the extension developer.

2. The computer implemented method of claim 1, wherein the at least one base object is associated with an application configured to support a set of standard processes.

3. The computer implemented method of claim 1, wherein the at least one base object is an object that is not configured to include extendable functionality.

4. The computer implemented method of claim 1, wherein the insertion point is defined as at least one of before a function, after a function and between a first and a second function.

5. The computer implemented method of claim 1, wherein the insertion point is defined as at least one of before an event, after an event and between a first and a second event.

6. The computer implemented method of claim 1, wherein the insertion point is defined as at least one of before a user interface, after a user interface and between a first and a second user interface.

7. The computer implemented method of claim 1, wherein the at least one control constraint includes at least one attribute constraint including usage permissions of at least one of an extension developer and an extension object to an artifact of the at least one base object.

8. The computer implemented method of claim 1, wherein the at least one control constraint includes at least one attribute constraint which specifies resources and access rights of the at least one base object that are available for extension code.

9. The computer implemented method of claim 1, wherein the method further comprises:
generating a list based on the at least one extendable object, the list including the associated insertion point and at least one associated control constraint; and
displaying the list.

10. The computer implemented method of claim 1, wherein the method further comprises:
generate at least one extension object based on the at least one extendable object; and
combining code associated with the at least one base object and the at least one extendable object.

11. A non-transitory computer-readable storage medium having stored thereon computer executable program code which, when executed on a computer system, causes the computer system to perform steps of:
generate at least one base object; and
generate at least one extendable object associated with the base object,
the extendable object defining an insertion point and is configured to enable addition of new functionalities to an application including the at least one base object, and
the at least one extendable object including an extension interface defined separately from the generating of the at least one base object, the extension interface being configured to define a plurality of application layers corresponding to architectural layers of the at least one base object, each of the plurality of application layers including at least one extensible artifact exposed to an extension developer, the extension interface including at least one control constraint configured to,
restrict an access to the at least one base object by an extension developer,
restrict a visibility of the at least one base object, as being hidden or visible, by the extension developer, and
restrict a usage right of the at least one base object by the extension developer.

12. The non-transitory computer-readable storage medium of claim 11, wherein the at least one base object is associated with an application configured to support a set of standard processes.

13. The non-transitory computer-readable storage medium of claim 11, wherein the at least one base object is an object that is not configured to include extendable functionality.

14. The non-transitory computer-readable storage medium of claim 11, wherein the insertion point is defined as at least one of before a function, after a function and between a first and a second function, before an event, after an event, between a first and a second event, before a user interface, after a user interface and between a first and a second user interface.

15. The non-transitory computer-readable storage medium of claim 11, wherein the at least one control constraint includes at least one attribute constraint including usage permissions of at least one of an extension developer and an extension object to an artifact of the at least one base object.

16. The non-transitory computer-readable storage medium of claim 11, wherein the at least one control constraint includes at least one attribute constraint which specifies resources and access rights of the at least one base object that are available for extension code.

17. The non-transitory computer-readable storage medium of claim 11, wherein the executable program code which, when executed by the computer system, further causes the computer system to:
generate a list based on the at least one extendable object, the list including the associated insertion point and at least one associated control constraint; and
display the list.

18. The non-transitory computer-readable storage medium of claim 11, wherein the executable program code which, when executed by the computer system, further causes the computer system to:
generate at least one extension object based on the at least one extendable object; and
combine code associated with the at least one base object and the at least one extendable object.

* * * * *